US008601401B2

(12) United States Patent
Coleman et al.

(10) Patent No.: US 8,601,401 B2
(45) Date of Patent: Dec. 3, 2013

(54) METHOD, APPARATUS AND COMPUTER PROGRAM PRODUCT FOR SYNCHRONIZING CURSOR EVENTS

(75) Inventors: Aaron Coleman, Broken Arrow, OK (US); Lance Lybarger, Broken Arrow, OK (US); Kevin Brown, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 847 days.

(21) Appl. No.: 12/363,495

(22) Filed: Jan. 30, 2009

(65) Prior Publication Data

US 2010/0199225 A1 Aug. 5, 2010

(51) Int. Cl.
*G06F 3/0481* (2013.01)

(52) U.S. Cl.
USPC ........... 715/858; 715/856; 345/641; 345/619; 342/90; 367/88; 709/205; 701/17

(58) Field of Classification Search
USPC ........................................................ 715/858
See application file for complete search history.

(56) References Cited

U.S. PATENT DOCUMENTS

| | | | | |
|---|---|---|---|---|
| 5,142,502 A | * | 8/1992 | Wilcox et al. | 367/88 |
| 5,713,045 A | * | 1/1998 | Berdahl | 719/318 |
| 5,802,492 A | * | 9/1998 | DeLorme et al. | 455/456.5 |
| 5,920,694 A | * | 7/1999 | Carleton et al. | 709/205 |
| 6,084,565 A | | 7/2000 | Kiya | |
| 6,115,027 A | * | 9/2000 | Hao et al. | 715/858 |
| 6,249,241 B1 | * | 6/2001 | Jordan et al. | 342/41 |
| 6,421,571 B1 | * | 7/2002 | Spriggs et al. | 700/17 |
| 6,424,292 B1 | | 7/2002 | Fujikawa et al. | |
| 6,927,703 B2 | * | 8/2005 | Watson | 340/979 |
| 7,109,913 B1 | * | 9/2006 | Paramore et al. | 342/26 B |
| 7,158,878 B2 | * | 1/2007 | Rasmussen et al. | 701/431 |
| 7,161,561 B2 | | 1/2007 | Kitayama | |
| 7,599,790 B2 | * | 10/2009 | Rasmussen et al. | 701/532 |
| 7,624,358 B2 | * | 11/2009 | Kim et al. | 715/855 |
| D621,413 S | * | 8/2010 | Rasmussen | D14/489 |
| 7,768,447 B2 | | 8/2010 | Pryszo et al. | |
| 7,865,301 B2 | * | 1/2011 | Rasmussen et al. | 701/457 |
| 7,904,835 B1 | * | 3/2011 | Dhawan et al. | 715/858 |
| 2002/0053983 A1 | * | 5/2002 | Chamas et al. | 340/945 |
| 2002/0054141 A1 | * | 5/2002 | Yen et al. | 345/804 |
| 2004/0095259 A1 | * | 5/2004 | Watson | 340/945 |

(Continued)

OTHER PUBLICATIONS

Humminbird, Sonar/GPS combo 1155c product manual, wayback machine <http://web.archive.org>, archived on Feb. 3, 2008, 9 pages.*

*Primary Examiner* — William Bashore
*Assistant Examiner* — Reza Nabi
(74) *Attorney, Agent, or Firm* — Alston & Bird LLP

(57) ABSTRACT

An apparatus for synchronizing cursor events may include a processor. The processor may be configured to receive an indication of a cursor event of a cursor presented within and associated with a sourcing window of a user interface that also includes a sourced window, wherein the cursor of the sourcing window indicates a geographical location within the geographical area presented by the sourcing window. Additionally, the processor may be configured to communicate information reflecting the cursor event to the sourced window. The processor may further be configured to subject the cursor of the sourced window to the cursor event reflected by the information to thereby synchronize a cursor event of the cursor of the sourced window with the cursor event of the cursor of the sourcing window, wherein the cursor of the sourced window indicates the geographical location indicated by the cursor of the sourcing window.

29 Claims, 11 Drawing Sheets

(56) References Cited

U.S. PATENT DOCUMENTS

| | | | |
|---|---|---|---|
| 2004/0267781 A1* | 12/2004 | Smolgovsky et al. | 707/100 |
| 2005/0270311 A1* | 12/2005 | Rasmussen et al. | 345/677 |
| 2006/0139375 A1* | 6/2006 | Rasmussen et al. | 345/641 |
| 2006/0238406 A1* | 10/2006 | Nohara et al. | 342/90 |
| 2009/0015674 A1* | 1/2009 | Alley et al. | 348/144 |
| 2010/0199225 A1* | 8/2010 | Coleman et al. | 715/858 |
| 2011/0013485 A1* | 1/2011 | Maguire | 367/88 |

* cited by examiner

METHOD, APPARATUS AND COMPUTER PROGRAM PRODUCT FOR SYNCHRONIZING CURSOR EVENTS

FIELD OF THE INVENTION

Embodiments of the present invention relate generally to navigation systems, and more particularly, to providing a mechanism to synchronize cursor events.

BACKGROUND OF THE INVENTION

Many systems exist today that aid geographical navigation or detect geographically dispersed objects, including sonar, computer-aided navigation and radar systems. Sonar has long been used to detect waterborne or underwater objects, such as bottom topography, detect fish or other waterborne contacts, locate wreckage, etc. Due to the limitations to underwater visibility, sonar is typically the most accurate way for individuals to locate objects underwater.

Computer-aided navigation systems in use today include satellite navigation systems such as the global positioning system (GPS), Global Navigation Satellite System (GNSS), and derivations thereof. These satellite navigation systems generally enable very accurate location determination or position fixing by utilizing measurements of precise timing signals broadcast from a constellation of GPS satellites in orbit around the earth. Location can be determined, for example, on a map in terms of longitude, latitude and/or altitude, and may be determined regardless of time, weather and location.

Radar has long been employed in applications such as navigation, air traffic control, fire control, etc. For example, radar may be used to identify the range, altitude, direction, or speed of both moving and fixed objects such as aircraft, ships, motor vehicles, weather formations, and terrain.

Since the development of sonar, computer-aided navigation and radar systems, display technology for these systems has also improved to enable better interpretation of their data. Paper chart recorders and other mechanical and/or manual output devices have been replaced by, for example, digital displays such as LCDs (liquid crystal displays). A display device may be configured to present a scrolling sonar chart reflecting sonar data about the location of a sonar system, a moving map reflecting navigation data about the location of a satellite-navigation receiver, or a plan position indicator (PPI) display reflecting radar data about the location of a radar system. In some instances, a combination of sonar data, navigation data and/or radar data may be provided in different respective windows on a single display device. For example, the display device may provide a combination of two separate windows, one presenting navigation data and the other presenting sonar data.

Although display technologies for sonar, computer-aided navigation and radar systems have improved to enable better interpretation of their data, it is generally desirable to continue improvement of existing technologies.

BRIEF SUMMARY OF THE INVENTION

In view of the foregoing background, exemplary embodiments of the present invention provide a method, computer program product and apparatus for automatic synchronization of cursor events. An apparatus of exemplary embodiments of the present invention may include a display configured to present a user interface including a plurality of windows each of which may be configured to provide a respective one of sonar, navigation or radar data reflecting a geographical position, location or the like (generally referred to as a geographical location) within a geographical area, region or the like (generally referred to as a geographical area). Each window may also be configured to present a cursor subject to one or more cursor events. The cursor may not only indicate a position within the window, but may also indicate a particular geographical location within the geographical area, where this geographical location may be the same as or different from the geographical location reflected by the sonar, navigation or radar data.

One of the windows (i.e., sourcing window) may be configured to source or otherwise transfer information reflecting the cursor events of its cursor to one or more of the other windows (i.e., sourced window(s)). In response to receiving the information, the respective sourced window(s) may be configured to subject their cursor(s) to the same or similar cursor events. Cursor events for the cursors of the sourced window(s) may therefore be automatically synchronized to the cursor events for the cursor of a sourcing window; thereby avoiding manual cursor synchronization between multiple windows for each cursor event, and enhancing user experience.

In one exemplary embodiment, a method for synchronizing cursor events is provided. The method may include receiving an indication of a cursor event of a cursor presented within and associated with a sourcing window of a user interface that also includes a sourced window, wherein the cursor of the sourcing window indicates a geographical location within the geographical area presented by the sourcing window. The method may further include communicating information reflecting the cursor event to the sourced window, wherein another cursor is presented within and associated with the sourced window; and in response thereto, subjecting the cursor of the sourced window to the cursor event reflected by the information to thereby synchronize a cursor event of the cursor of the sourced window with the cursor event of the cursor of the sourcing window, wherein the cursor of the sourced window having been subjected to the cursor event indicates the geographical location indicated by the cursor of the sourcing.

In another exemplary embodiment, a computer program product for synchronizing cursor events is provided. The computer program product includes at least one computer-readable storage medium having computer-executable program code instructions stored therein. The computer-executable program code instructions may include program code instructions for receiving an indication of a cursor event of a cursor presented within and associated with a sourcing window of a user interface that also includes a sourced window, wherein the cursor of the sourcing window indicates a geographical location within the geographical area presented by the sourcing window. The computer-executable program code instructions may include program code instructions for communicating information reflecting the cursor event to the sourced window, wherein another cursor is presented within and associated with the sourced window; and in response thereto, program code instructions for subjecting the cursor of the sourced window to the cursor event reflected by the information to thereby synchronize a cursor event of the cursor of the sourced window with the cursor event of the cursor of the sourcing window, wherein the cursor of the sourced window having been subjected to the cursor event indicates the geographical location indicated by the cursor of the sourcing window.

In yet another exemplary embodiment, an apparatus for synchronizing cursor events is provided. The apparatus may include a processor configured to receive an indication of a cursor event of a cursor presented within and associated with a sourcing window of a user interface that also includes a sourced window, wherein the cursor of the sourcing window indicates a geographical location within the geographical area presented by the sourcing window. The processor may further be configured to communicate information reflecting the cursor event to the sourced window, wherein another cursor is presented within and associated with the sourced window; and in response thereto, subject the cursor of the sourced window to the cursor event reflected by the information to thereby synchronize a cursor event of the cursor of the sourced window with the cursor event of the cursor of the sourcing window, wherein the cursor of the sourced window having been subjected to the cursor event indicates the geographical location indicated by the cursor of the sourcing window.

Embodiments of the invention provide users with an ability to automatically synchronize cursor events between multiple windows of a display device. As a result, the multiple windows may be automatically synchronized to the same or approximately the same location (e.g., geographical location), and the user may analyze and/or review different types of information associated with the location. For example, a user may be presented with navigation data associated with a cursor position (e.g., a particular geographical location) on one window, and sonar and/or radar data associated with corresponding cursor locations (e.g., the same or approximately the same location) on other windows.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
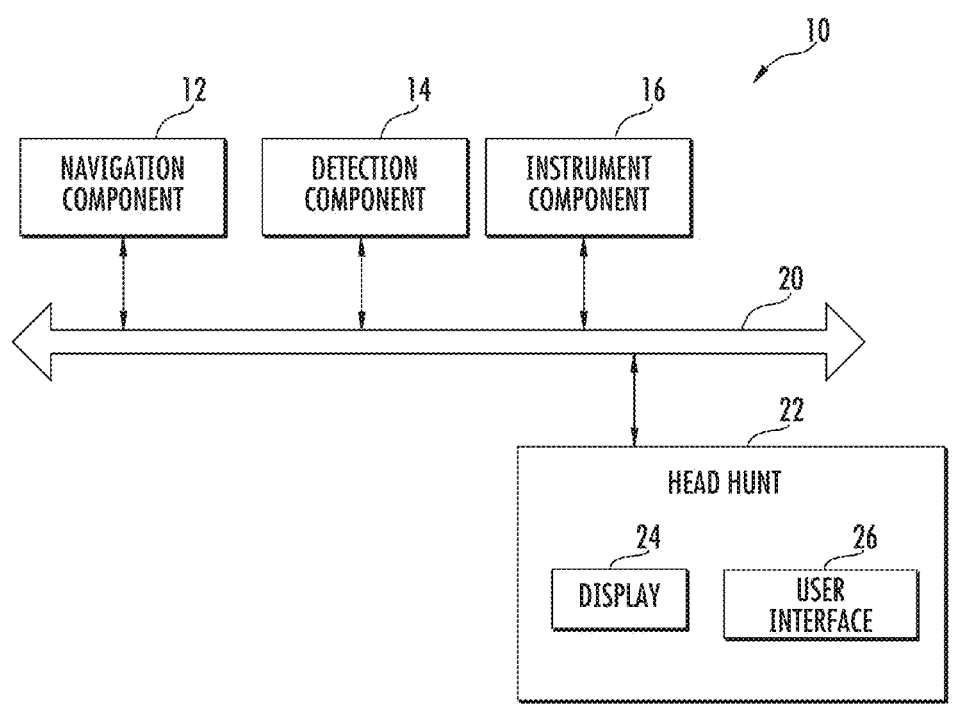
FIG. 1 is a basic block diagram illustrating an apparatus that may benefit from exemplary embodiments of the present invention.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received and/or stored in accordance with embodiments of the present invention. Moreover, the term "exemplary," as used herein, is not provided to convey any qualitative assessment, but instead merely to convey an illustration of an example. The terms "automatic," "automatically," "automated" or the like may be used interchangeably to refer to an action or operation requiring no user intervention. The term "sourcing window" may be used to refer to an active window of a user interface that may be configured to present an associated cursor subject to one or more cursor events and transfer information reflecting those cursor events to one or more other windows of the user interface. The term "sourced window" may be used to refer to one of the other window(s) of the user interface, an inactive window that may be configured to similarly present an associated cursor subject to one or more cursor events. This sourced window may be configured to receive the information from the sourcing window, and in response thereto, subject its associated cursor to one or more cursor events similar to or same as the cursor events of the sourcing-window cursor. In various exemplary embodiments, the sourcing window and the sourced window may each provide different types of information.

The term "cursor" may be used to refer to a movable pointer, caret, indicator or the like that indicates a position within a display or window of a display associated with the pointer, caret, indicator or the like. The terms "cursor event," "cursor events" or the like may be used to refer to actions associated with a cursor. These events may include, for example, cursor movements (e.g., left, right, down, up, diagonal, and/or the like), calling up a cursor (e.g., causing a cursor to appear on a window), dropping a cursor (e.g., causing a cursor to disappear from the window), implementing an action based upon cursor location, or the like.

Exemplary embodiments of the present invention generally provide a method, computer program product and apparatus for automatic synchronization of cursor events between windows of a user interface, where each window presents information often reflecting a geographical area, region or the like (generally referred to as a geographical area). The apparatus of exemplary embodiments of the present invention may include a display configured to present a user interface including a plurality of windows presenting various types of geographical information, such as sonar, navigation, and/or radar data. This geographical information may reflect a geographical location about a geographical area. In some exemplary embodiments, the sourced window(s) and the sourcing window may each be configured to present the same or different types of information. In instances including multiple sourced windows, the sourced windows may each be configured to present the same or different types of information.

For example, in the context of sonar data, the geographical information may be presented by a sonar chart; in the context of navigation data, the geographical information may be presented by a map; and in the context of radar data, the geographical information may be presented by a PPI display. Each window may include a respective, associated cursor (in a visible state or an invisible state) that may not only indicate a position within the window, but that may also indicate a particular geographical location within the geographical area, where this geographical location may be the same as or different from the geographical location reflected by the geographical information. Each window may also present the position (e.g., current position) of the apparatus as may be determined from the sonar data, navigation data or radar data. The apparatus may include a user input interface (e.g., directional keys) which may be used to direct the movement of the cursor of any one or more of the windows of the user interface in a number of different manners (e.g., by actuating the directional keys).

At any given time, one of the windows may function as a sourcing window in that it may be configured to transfer information reflecting one or more cursor events of its cursor to one or more other windows of the user interface; and the respective other window(s) may function as sourced windows in that they may be configured to subject their respective cursors to the same or similar cursor event(s) in response to the information from the sourcing window. In this regard, one or more sourced windows may receive information reflecting one or more cursor events of a cursor associated with a sourcing window, and in response thereto, subject their respective cursor(s) to the same or similar cursor events. Accordingly, cursor events of one or more sourced windows may be synchronized with cursor events of a sourcing window.

More particularly in instances in which the sourcing and sourced windows are configured to present different types of information, cursor events of a sourcing window configured to present one type of information may be synchronized with cursors events of one or more sourced windows configured to present a different type of information. In other words, cursor events of a sourcing window may drive cursor events of one or more sourced windows.

In a more particular example, a user of the apparatus of exemplary embodiments may direct movement of a cursor (cursor event) within an associated sourcing window (e.g., an active window on a display) presenting a map (reflecting navigation data), where movement of the cursor may be to a desired geographical location within the map. This movement may be directed in a number of different manners, such as by the user actuating directional keys of a user interface of the apparatus. This cursor event within the sourcing window may, in turn, cause the same or a similar movement of a cursor associated with and within a sourced window (e.g., an inactive window). The sourced window may be presenting a PPI display (reflecting radar data), for example; and in such instances, the cursor event of moving the cursor of the sourcing window may cause the sourced window to automatically move its cursor to the same or approximately the same geographical location within the PPI display. To carry out this cursor event with respect to its associated cursor, the sourced window may therefore receive information indicating the new geographical location indicated by the cursor of the sourcing window, and in response thereto, place its associated cursor at the same or approximately the same geographical location within its own window.

In other situations, the apparatus or user may direct the user interface to drop or otherwise hide the cursor from the sourcing window (cursor event), such as by directing cancellation of a cursor mode of the sourcing window. In these situations, information reflecting this cursor event may be passed to one or more sourced windows, which in response thereto, may similarly cancel the cursor modes of the respective sourced window(s). Thus, in a more particular example, performing a function to remove the cursor from a sourcing window presenting sonar data (e.g., by depressing an exit button on a user interface) may cause a sourced window presenting navigation data to similarly remove its cursor. In some situations, the view of the sourced window may be modified in response to the removal of the source window's associated cursor (e.g., the view may be centered on the position of the watercraft). As such, cursor events of a cursor associated with a sourced window presenting a particular type of information may be synchronized with cursor events of the respective cursor of a sourcing window providing information of a different type. Accordingly, different types of information associated with the same desired geographical location may be simultaneously presented.

Exemplary embodiments of the present invention may be described generally with respect to a marine apparatus with which a watercraft may be equipped. It should be understood, however, that exemplary embodiments of the present invention may be equally applicable to any of a number of other apparatuses that may be portable and carried by a user, or that may be portable or fixed and with which any of a number of vehicles (e.g., automobile, motorcycle, train, aircraft, hovercraft, spacecraft, etc.) may be equipped. These apparatus may be dedicated apparatuses, or may be incorporated into an apparatus designed for one or more other purposes (e.g., mobile telephone, personal digital assistant, personal computer, laptop computer or the like). Although exemplary embodiments of the present invention may be described generally with respect to two windows (e.g., providing sonar, radar and/or navigation data), embodiments of the present invention may be equally applicable to a plurality of windows (e.g., more than two windows) providing sonar, radar, navigation data, and/or additional types of data (e.g., data in addition to sonar, navigation and/or radar data). Further, although exemplary embodiments of the present invention may be described generally with respect to the synchronization of a single cursor of a sourced window, embodiments of the present invention may be equally applicable to the synchronization of a plurality of cursors of a sourced window.

FIG. 1 is a basic block diagram illustrating a marine apparatus 10 that may benefit from exemplary embodiments of the present invention. In some embodiments, the marine apparatus 10 may be included aboard a watercraft, vessel or the like (generally referred to as a vessel). As shown, the marine apparatus 10 may include a number of different components, each of which may comprise any device or means embodied in hardware, software or a combination of hardware and software configured to perform one or more functions. For example, the marine apparatus may include a navigation component 12, a detection component 14, an instrument component 16 and/or numerous other peripheral components or devices. The components 12, 14 and 16 may each or collectively be embodied as any means such as device or circuitry embodied in hardware alone or in combination with software and/or firmware that may be configured to perform the corresponding functions of the respective components.

One or more of the components may be configured to communicate with one or more of the other components, and/or with a head unit 22 that may be configured to process and/or display data, information or the like from one or more of the modules. The components and/or head unit may be configured to communicate with one another in any of a number of different manners including, for example, via a network 20. In this regard, the network 20 may be any of a number of different communication backbones or frameworks including, for example, the NMEA 2000 framework. It should be noted that although FIG. 1 shows the components 12, 14 and 16 as being separate elements from the head unit 22, any one or more of the components may alternatively be embodied within head unit 22 or be coupled to the head unit 22 without an intermediate network 20. Additionally or alternatively, one or more of the functions of one or more of the components 12, 14 and 16 may be instead performed by the head unit 22.

The head unit 22 may include a display 24 configured to display any of a number of visual objects including, for example, a graphical user interface; and a user input interface 26 configured to receive an input from a user of the head unit 22. The display 24 may be, for example, a conventional LCD (liquid crystal display) or any other suitable display known in the art upon which images may be rendered. And the user input interface 26 may include, for example, a keyboard, keypad, function keys, directional keys, mouse, scrolling device, touch screen, touch pad, or any other mechanism by which a user may interface with the head unit 22.

The navigation component 12 may include any of a number of different navigation devices configured to receive navigation data from one or more external sources and generate location information indicative of the location of the apparatus, and thus, the vessel equipped with the marine apparatus 10. For example, the navigation component 12 may include one or more GPS (global positioning system) or other satellite navigation system components, inertial navigation system components, terrestrial navigation system components (e.g., LORAN-C) or the like. The navigation component may include a receiver configured to receive signals from another component of their respective navigation systems, such as microwaves or other radio waves from orbiting satellites, or electric signals from a motion sensor, and convert such signals into corresponding navigation-related data. The navigation component may also include a signal processor (and accompanying memory), such as a processor, coprocessor, controller, ASIC (application specific integrated circuit), FPGA (field programmable gate array), hardware accelerator or the like. The signal processor may be configured to process the navigation-related data to determine the location of the navigation component, and thus the apparatus 10. This location may be reflected by navigation data, which may be output by the navigation component to the head unit 22, which as explained below, may be configured to present the navigation data in a window of a user interface, such as in the form of a map including an area about the location of the apparatus 10.

The detection component 14 may include any of a number of different detection and ranging systems for detecting objects, structures or aids to navigation. For example, the detection component 14 may include a sonar system that uses sound wave transmissions to determine water depth or detect fish and/or other waterborne contacts in an area about the apparatus 10. In this regard, the sonar system may include a transmitter, receiver and signal processor. The transmitter may be configured to emit sound energy into water, which energy may reflect off of various targets in the water (including the floor of the body of water ) and be received by the receiver. The receiver may be configured to receive the reflected sound energy and convert such energy into corresponding sonar data. The signal processor (and accompanying memory), such as a processor, coprocessor, controller, ASIC, FPGA, hardware accelerator or the like, may be configured to process the sonar data for output to the head unit 22, which as explained below, may be configured to present the sonar data in a window of a user interface, such as in the form of a sonar chart.

Additionally or alternatively, for example, the detection component 14 may include a conventional radar system that uses radio frequency transmissions to determine ranging information and other position related information associated with vehicles (e.g., automobile, motorcycle, train, aircraft, hovercraft, spacecraft, etc.) or aids to navigation in an area about the apparatus 10. Similar to the sonar system, the radar system may include a transmitter, receiver and signal processor. The transmitter may be configured to emit microwaves or other radio waves, which may reflect off of various targets and be received by the receiver. The receiver may be configured to receive and convert the reflected waves into corresponding radar data. The signal processor may be configured to process the radar data for output to the head unit 22, which as explained below, may be configured to present the radar data in a window of a user interface, such as in the form of a PPI.

The instrument component 16 may be configured to receive analog or digital information related to a parameter measured at a particular device, and communicate that information to the network 20 in a digital format. For example, the instrument component 16 may be configured to receive information from numerous sensors configured to measure parameters at numerous corresponding shipboard devices such as fuel level, speed, engine RPM (revolutions per minute), engine fluid temperature and/or pressure, battery state of charge, etc. The instrument component 16 may therefore include or otherwise communicate with any of a number of different devices such as, for example, a tachometer, speedometer, thermometer, pressure gauge, volt meter, fuel level sensor, etc. Where applicable, the instrument component 16 may include analog-to-digital conversion capabilities to communicate digital data to the network 20.

Figure 2:
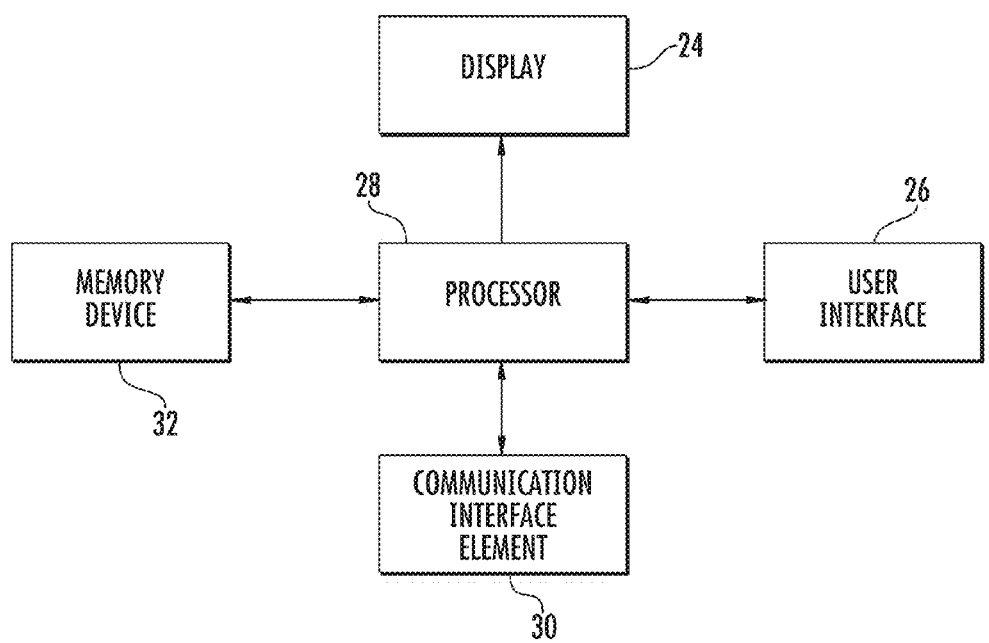
FIG. 2 illustrates a basic block diagram of a head unit according to an exemplary embodiment of the present invention.

As indicated above, the head unit 22 may be configured to receive data, information or the like via the network 20 and process and/or display the received data. FIG. 2 illustrates a basic block diagram of the head unit 22 according to an exemplary embodiment of the present invention. As shown, in addition to a display 24 and user input interface 26, the head unit 22 may include a processor 28, communication interface element 30 and memory device 32. The memory device 32 may include volatile and/or non-volatile memory, and may be configured to store information, data, applications, instructions or the like for enabling the head unit to carry out various functions in accordance with exemplary embodiments of the present invention. For example, the memory device 32 may be configured to store data including, for example, sonar, navigation and/or radar data.

The processor 28 may be embodied in many manners. For example, the processor 28 may be embodied as a processor, a coprocessor, a controller or various other processing means or devices including integrated circuits such as, for example, an ASIC, FPGA, hardware accelerator or the like. In various exemplary embodiments, the processor 28 may be configured to execute instructions that are stored in the memory device 32 or are otherwise accessible to the processor 28. As such, whether configured by hardware alone or in combination with software and/or firmware, the processor 28 may represent an entity configured to perform operations according to embodiments of the present invention. Meanwhile, the communication interface element 30 may be embodied as any device or means embodied in either hardware, software, or a combination of hardware and software that is configured to receive and/or transmit data from/to the network 20.

Figure 3:
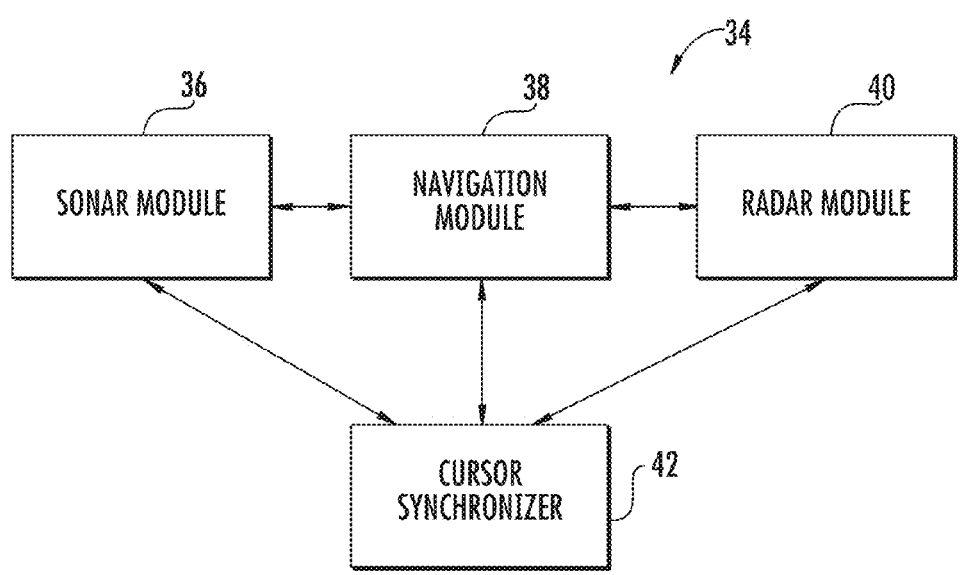
FIG. 3 illustrates a functional block diagram of an apparatus for synchronizing cursor events according to an exemplary embodiment of the present invention.

FIG. 3 illustrates a functional block diagram of an apparatus 34 for synchronizing cursor events in accordance with exemplary embodiments of the present invention, which apparatus 34 may be embodied in the apparatus 10 of FIG. 1. As shown, the apparatus 34 includes a sonar module 36, navigation module 38, radar module 40 and a cursor synchronizer 42. Relative to the apparatus 10 of FIG. 1, one or more of the elements of the apparatus 34 (e.g., the sonar module 36, the navigation module 38, the radar module 40, the cursor synchronization 42) may be embodied in any one or more of the components 12, 14 and 16, and/or the head unit 12. For example, all of the modules 36, 38 and 40, as well as the cursor synchronizer 42 may be embodied in the head unit 22. Alternatively, the sonar module 36 and radar module 40 may be embodied in the detection component 14, while the navigation module 38 may be embodied in the navigation component 12, and the cursor synchronizer may be embodied in the head unit 22 or in one or more or each of the components 12, 14 and 16.

The sonar module 36 and radar module 40 may be configured to communicate with the detection component 14, and the navigation module 38 may be configured to communicate with the navigation component 12. Additionally, one or more of the modules 36, 28 and 40 may be configured to communicate with the instrument component 16. In turn, the cursor synchronizer 42 may be configured to communicate with the modules 36, 28 and 40. The modules 36, 38 and 40 may thereby be configured to receive data from respective components 12, 14 and 16 of the apparatus; and the cursor synchronizer 42 may be configured to receive data from the modules 36, 38 and 40, and send data to the modules 36, 38 and 40.

The sonar module 36, navigation module 38 and radar module 40 may be configured to receive sonar, navigation and radar data, respectively. The modules 36, 28 and 40, then, may be configured generate one or more windows of a user interface to present the respective data—although it should be understood that the modules 36, 38 and 40 may instead or pass the data to the user interface including one or more windows for presentation in those window(s). In this regard, the sonar module 36 may be configured to receive sonar data (e.g., from the detection component 14) and generate a window of the user interface to present the sonar data, such as in the form of a sonar chart including a geographical area. The navigation module 38 may be configured to receive navigation data (e.g., from the navigation component 12) and generate a window of the user interface to present the navigation data, such as in the form of a map including a geographical area. And the radar module 40 may be configured to receive radar data (e.g., from the detection component 14) and generate a window of the user interface to present the radar data, such as in the form of a PPI including a geographical area. The geographical areas presented by the sonar chart, map and PPI generally include an area about the apparatus and to this extent may at least partially overlap.

At any given time during generation of the windows in the user interface, multiple ones of the windows may also present a cursor that not only indicates a position within the respective windows, but may also indicate a particular geographical location within the geographical area presented within the respective windows, where this geographical location may be the same as or different from the geographical location reflected by the sonar, navigation or radar data. Also, at any given time during generation of the windows in the user interface, one of the windows may be active while the others are inactive. Generally, the cursor of the active (sourcing) window may be subjected to various cursor events directed by a user of the apparatus, such as via the user input interface 26.

In some exemplary embodiments of the present invention, at a default or initial state, the cursors of one or more of the windows may not be presented. Nevertheless, the cursors may be called up to their respective window upon a user interaction with a user input interface (e.g., user input interface 26) such as, for example, directional keys, which may call up a cursor (e.g., from an invisible state to a visible state) on the sourcing window (e.g., the window in the foreground) and cause the cursor to be moved about various geographical locations displayed on the sourcing window. The cursors of one or more sourced windows may automatically be called up and moved about corresponding geographical locations displayed on the sourced windows. Similarly, a user may interact with the user input interface to cause the cursor to be dropped from the sourcing window. Consequently, the cursors of one or more sourced windows may be dropped (e.g., from a visible state to an invisible state) from the sourced windows. In some examples, the view of the sourcing window and/or the one or more sourced windows may be center on the vessel position when the cursor of the sourcing window is dropped.

In addition to the aforementioned sonar, navigation and radar data, the windows generated by the respective modules 36, 38 and 40 may also provide information indicative of their status as either sourcing window or sourced window. The sonar module 36, the navigation module 38, and/or the radar module 40 may be in communication with one another and as such, the windows respectively generated by the sonar module 36, the navigation module 38, and/or the radar module 40 may communicate with each other. As such, information associated with or reflecting the cursor events of a cursor of a window functioning as a sourcing window may be transferred or communicated (e.g., broadcast) to one or more windows functioning as sourced windows. Accordingly, the one or more sourced windows may receive the information, and subject their respective cursors to the same or cursor events similar to the cursor events of the cursor of or otherwise associated with the sourcing windows based on the received information. The information received by the sourced windows may include the geographical coordinates (e.g., the latitude, longitude, and/or the like) associated with the position (e.g., newest or most current position) of the cursor associated with the sourcing window. The information may also include the type of information provided by the sourcing window. As such, the one or sourced windows may determine whether the type of information provided by the sourcing window is the same as the type of information they provide based on the received information.

Accordingly, the information may be used by the one or more sourced windows to place their respective cursors at the same or approximately the same position as the position of the cursor associated with the sourcing window based at least in part the received information (e.g., geographical coordinates, the type of information provided by the one or more sourced windows and the sourcing window, or the like). The information may be used by the one or more sourced windows to cause the respective cursors of the one or more sourced windows to appear or disappear from the one or more sourced windows based on a visible state or invisible state of the cursor of the sourcing window. The placement of the cursor of the one or more identified sourced windows may be performed simultaneously with each movement of the cursor of the sourcing window, or within a predetermined amount of time after each movement of the cursor of the sourcing window. In some examples, the respective cursors of the one or more sourced windows may be simultaneously updated (e.g., for each cursor event of the cursor of the sourcing window), while in other examples, the respective cursors of the one or more sourced windows may be sequentially updated based on a predetermined order of the one or more sourced windows (e.g., for each cursor event of the cursor of the sourcing window). Although a sourcing window may send information regarding the one or more cursor events of its associated cursor to one or more sourced windows and as such cause the cursor events of the cursor associated with each of one or more sourced windows to be synchronized with the cursor events of the cursor associated with a sourcing window, each window (e.g., sourcing or sourced) may independently and/or directly receive the position or location of a vessel (e.g., including apparatus 34), which position may be provided on a display (e.g., display 24). In other words, the sonar module 36, the navigation module 38, and/or the radar module 40 may be configured to independently determine the vessel position for their respectively generated window. As such, for example, a sourced window may directly receive updates to the location of a vessel independently of receiving updates to the location of the cursor associated with the sourcing window.

The cursor synchronizer 42 may be embodied as any means such as device or circuitry embodied in either hardware, software, or a combination of hardware and software (e.g., the processor 28 operating under software control, the processor 28 embodied as an ASIC or FPGA specifically configured to perform the operations described herein, or a combination thereof) that may be configured to perform the corresponding functions of the cursor synchronizer 42 as described below such as synchronize the cursor events of a plurality of windows of a display device, such as, for example, display 24. In this regard, the cursor synchronizer 42 may be configured to automatically synchronize the cursor events of the cursor associated with each of the one or more sourced windows with the cursor events of the cursor associated with a sourcing window. For example, the cursor synchronizer 42 may be configured to cause the movements of cursors associated with one or more sourced windows to be synchronized with the movements of a cursor associated with a sourcing window. In this regard, for each movement of the cursor associated with a sourcing window, the cursor synchronizer 42 may be configured to automatically place the respective cursors of one or more sourced window at the same or approximately the same location (e.g., geographical location) as the current location of the cursor associated with a sourcing window.

As show in FIG. 3, the cursor synchronizer 42 may be in communication with one or more of the sonar module 36, the navigation module 38 and/or the radar module 40. As such, the cursor synchronizer 42 may be configured to receive information associated with the cursor events of the windows generated by the sonar module 36, the navigation module 38 and/or the radar module 40. The cursor synchronizer 42 may also be configured to receive from the windows and/or their source (e.g., the sonar module 36, the navigation module 38 and/or the radar module 40) information indicative of their status as sourcing window or sourced window. The cursor synchronizer 42 may be configured to identify a sourcing window and one or more sourced windows from the windows generated by the sonar module 36, the navigation module 38 and/or the radar module 40, and determine the type of information provided by the identified sourcing and sourced windows based at least in part on the information received from the windows and/or their source (e.g., the sonar module 36, the navigation module 38 and/or the radar module 40). For example, the cursor synchronization 42 may determine that the sourcing window is generated by the sonar module 36 and as such provides sonar data. As further example, the cursor synchronization 42 may determine that the sourcing window is generated by the radar module 40 and as such provides radar data. In some embodiments, the cursor synchronizer 42 may be configured to only receive information associated with the cursor events of a sourcing window. In this regard, the cursor synchronizer 42 may be configured to first identify a sourcing window and then receive information associated with the cursor events of the identified sourcing window.

The cursor synchronizer 42 may be configured to identify one or more sourced windows based at least in part on the information received from the windows and/or their source, and determine the type of information provided by the identified one or more sourced windows based on at least in part on the source of the window (e.g., the sonar module 36, the navigation module 38 and/or the radar module 40). In some situations, a user may determine via a user input interface (e.g., user input interface 26) which one or more sourced windows to synchronize with the sourcing window. As such, in some embodiments, the cursor synchronizer 42 may be configured to receive the user input (e.g., from the user input interface 26), and identify one or more sourced windows to synchronize based on the user input. The cursor synchronizer 42 may be configured to compare the type of information provided by the identified sourcing window with the type of information provided by the identified one or more sourced windows. As such, the cursor synchronizer 42 may be configured to determine whether the sourcing window and the one or more sourced windows provide information of a same or a different type. In some embodiments, the cursor synchronizer 42 may be configured to send information associated with the cursor event of a sourcing window to one or more sourced windows based on the comparison (e.g., if the type of information provided by the one or more sourced windows is different from the type of information provided by the sourcing window). In other embodiments, the cursor synchronizer 42 may be configured to send information associated with the cursor event of a sourcing window to one or more sourced windows regardless of the comparison.

The cursor synchronizer 42 may be configured to automatically place or plot the respective cursors of the one or more identified sourced windows on the one or more windows at the same or approximately the same location as the location of the cursor of the sourcing window. The placement of the cursor of the one or more identified sourced windows may be performed simultaneously with each movement of the cursor of the sourcing window, or within a predetermined amount of time after each movement of the cursor of the sourcing window. In this regard, for example, the cursor synchronizer 42 may automatically place the cursor of a sourced window on the source window at the same or approximately the same location (e.g., geographical location) corresponding to the location of the cursor of the sourcing window based on the comparison discussed above. If the placement of the cursor of the one or more sourced windows is at a predetermined distance from the location of the cursor of the sourcing window, the cursor synchronizer 42 may be configured to cause a message indicative of the deviation (e.g., how far from the location corresponding to the location of the cursor of the sourcing window) to be displayed on the one or more sourced windows whose cursor location is at a predetermined distance from the location of the cursor of the sourcing window. The cursor synchronizer 42 may also be configured to automatically cause the cursor of the one or more sourced windows to appear or disappear based on a visible state (e.g., calling up a cursor) or invisible state (e.g., dropping a cursor) of the cursor of the sourcing window based on the comparison discussed above. In some instances, upon dropping the cursor from the sourcing window, the view of the sourcing window and/or the one or more sourced windows may be centered based on the location (e.g., current location) of the vessel. In some examples, the corresponding location of the cursor of the sourcing window may be outside the current of view of the one or more sourced windows. Accordingly, the cursor synchronizer 42 may be configured to adjust the view of the sourced windows if the cursor position in the sourcing window is outside the current view of the sourced windows by, for example, zooming in, zooming out, panning, and/or the like. In some examples, the new view may be centered on the corresponding location of the cursor of the sourcing window or in other words, the new location of the cursor of the sourced window. Although in some embodiments, the sourcing window may send the information associated with the cursor events of the cursor associated with the window sourcing directly to one or more sourced windows as discussed above, the cursor synchronizer 42 may nevertheless perform one or more of the functions described above.

As mentioned above, the cursor synchronizer 42 may correspond to one or more portions of the head unit 22 or may otherwise be in communication with the one or more portions head unit 22 (e.g., user input interface 26, processor 28, memory device 32, and/or the like). Nevertheless, although not shown in FIG. 3, in an exemplary embodiment, the cursor synchronizer 42 may include an interface element, a storage media and a function execution element. The interface element may be embodied as any device or means embodied in either hardware, software, or a combination of hardware and software that is configured to receive a user input (e.g., via the user input interface 26) instruction for directing the function execution element to perform a function with respect to the information provided by the sonar module 36, the navigation module 38 and/or the radar module 40. The storage media may be any volatile and/or non-volatile memory device capable of storing information provided by the sonar module 36, the navigation module 38 and/or the radar module 40. The function execution element may be embodied as any device or means embodied in either hardware, software, or a combination of hardware and software that is configured to perform one or more functions with respect to the sonar data, such as function(s) as determined by user instruction(s) (via, e.g., the interface element).

As mentioned above, although a sourcing window may send information regarding the one or more cursor events of its associated cursor to one or more sourced windows and as such cause the cursor events of the cursor associated with each of one or more sourced windows to be synchronized with the cursor events of the cursor associated with a sourcing window, each window (e.g., sourcing or sourced) may independently and/or directly receive the position or location of a vessel (e.g., including apparatus 34), which position may be provided on a display (e.g., display 24). In other words, the sonar module 36, the navigation module 38, and/or the radar module 40 may be configured to independently determine the vessel position for their respectively generated one or more windows.

Reference is now made to FIGS. 4-10, which illustrate user interfaces that may be presented according to an exemplary embodiment of the present invention. As shown, the user interface may include a navigation data window 60, a radar display window 62 and a sonar display window 76, any one or more of which may be present within the user interface at any given time. Although FIGS. 4-10 show examples in which the navigation data window 60, radar display window 62 and sonar display window 76 are simultaneously displayed in various combinations of two of the windows, it may alternatively be possible to display any combination of the above mentioned windows, alone or in further combination with other windows not discussed herein or illustrated in FIGS. 4-10. Thus, for example, any one of the navigation data window 60, radar display window 62 and sonar display window 76 could alternatively each be displayed in a full-screen context or all of the windows may be simultaneously displayed.

Figure 4:
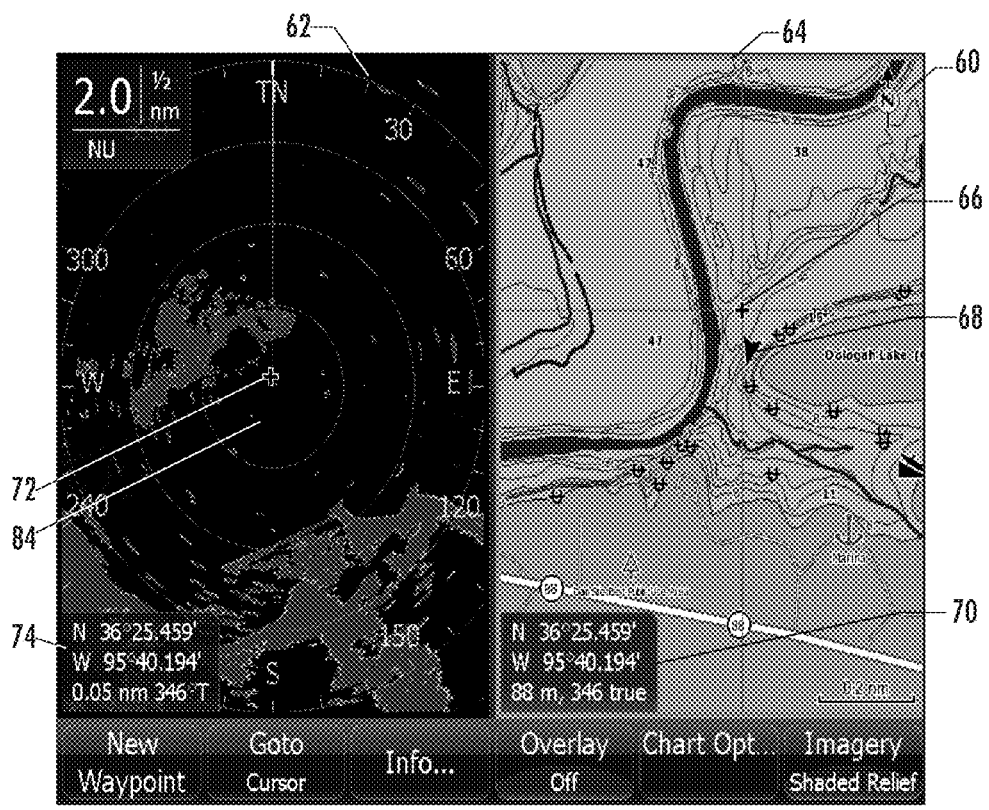
FIGS. 4-10 illustrate example displays according to an exemplary embodiments of the present invention.
Figure 5:
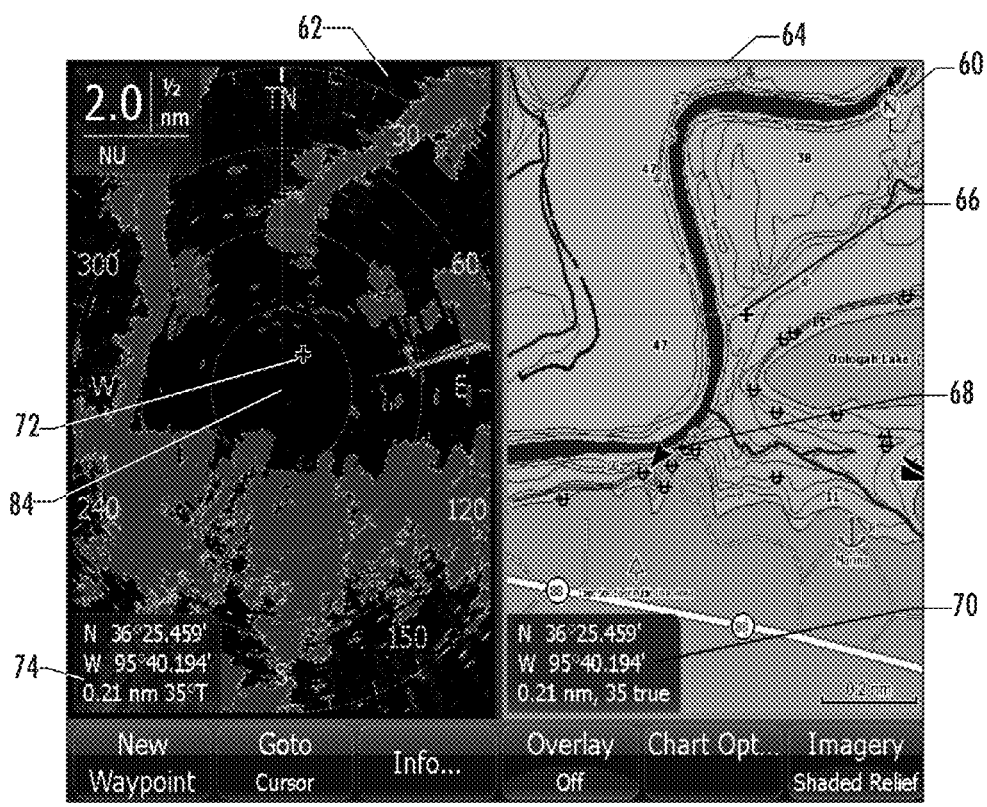

Referring now to FIGS. 4 and 5, the navigation data window 60 may include navigation data and/or other related data provided, for example, in response to data received from the navigation component 12. For example, the navigation data window 60 may display vessel track, contact data, charted depth, current vessel location, one or more aids to navigation, scale information or the like. In the exemplary embodiment of FIG. 4, the navigation data window 60 includes a current vessel location marker 68 that may also indicate vessel heading. The window 60 may also include a cursor 66 indicating a particular geographical location within the geographical area presented by the map within the window 60, and a map cursor position information area 70 that may identify the particular geographical location indicated by the cursor. Relative to the navigation data window 60, the user interface may present an active (sourcing) window indicator 64 which may indicate that the navigation data window 60 is currently active (and thus currently the sourcing window). In some embodiments, the sourcing window indicator 64 may be provided around the window with one or more attributes (e.g., color, shade, and/or the like) that may draw the user attention.

The radar data window 62 may include radar data and/or other related data provided, for example, in response to data received from the navigation component 12. The radar data window 62 may include a cursor 72 indicating a particular geographical location within the geographical area presented by the PPI within the window 62, and aa radar cursor position information area 74 that may identify the particular geographical location indicated by the cursor. As shown, the geographical area presented by the window 62 may be centered about an area 84 that may be based on the current location of the vessel.

At an initial state, the cursors 66 and 72 may not be presented within their respective, associated windows 60 and 62. The user may interact with the user input interface 26 (e.g., by depressing directional keys) to select and thus activate the navigation data window 60 (if not already activated), and to call up its cursor 66. This cursor event, in turn, may be communicated to the radar display window 62, which in response thereto, calls up its cursor 72. By default, the called-up cursors 66 and 72 may indicate the current geographical location of the apparatus, and thus the vessel equipped with the apparatus, within the geographical areas presented by the respective windows 60 and 62.

Again by interaction with the user input interface 26, then, the user may direct movement of the cursor 66 of the active (sourcing) window 60 from its current position to another position indicating another geographical location. Similar to before, this cursor event may be communicated to the radar display window 62, which in response thereto, moves its cursor 72 to the same or a similar geographical location within its window 62 to thereby synchronize the cursors of the windows 60 and 62 to the respective geographical location. This synchronization of the geographical location may be reflected by not only the cursors 66 and 72, but also by the cursor position areas 70 and 74 (shown as reflecting the same latitude and longitude).

FIG. 5 illustrates that the vessel has moved to a different location as indicated by the current vessel position marker 68 on the navigation data window 60. Radar data window 62 also illustrates that the vessel has moved to a different location as indicated by the change of data provided by the center position area 84. In this regard, as the vessel moves, the center position area 84 may also move to reflect that move. As indicated above, each window may independently receive new vessel location and therefore the vessel location may be independently updated on each window. Nevertheless, the chart cursor position information area 70 indicates that the cursor 66 of the navigation data window 60 has not changed; and the chart cursor position information area 70 and the radar cursor position information area 74 indicate that the cursors 66 and 72 are positioned at the same geographical location in their respective windows 60 and 62. As such, as the vessel moves, the distance between the cursor and the position may automatically increase. Additionally, as the vessel moves and the position of the vessel is independently updated, the sourced window may update its cursor location based on the information of the cursor of the sourcing window. In this regard, with each independent update of the vessel position on the radar data window 62, its cursor 72 may maintain synchronization with the cursor 66 of the navigation data window 60.

Figure 6:
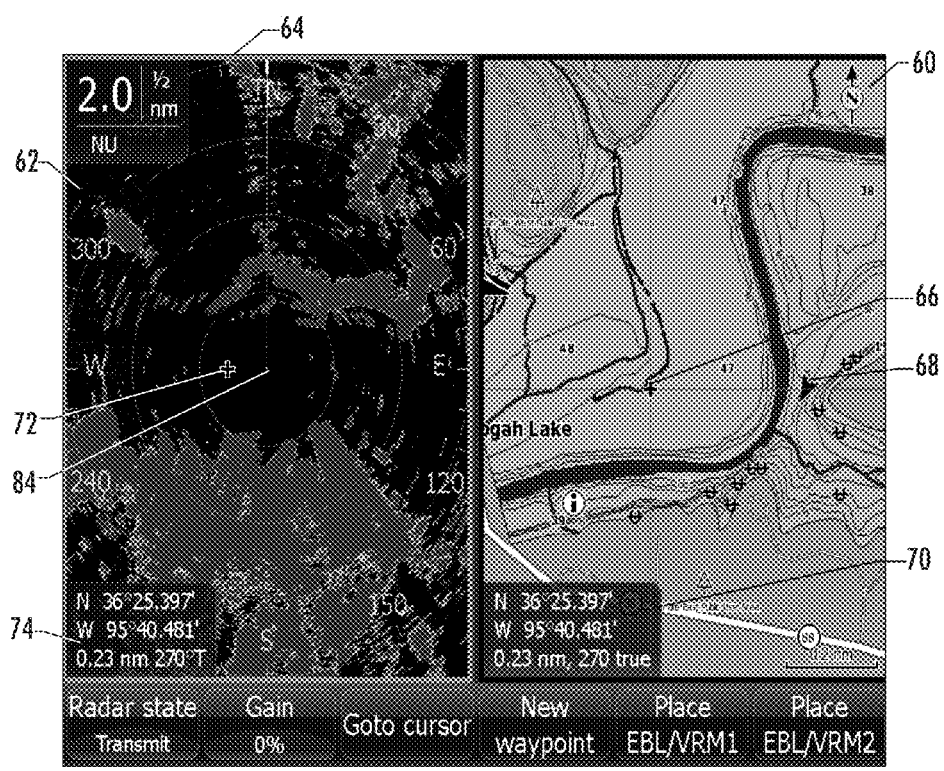
Figure 7:
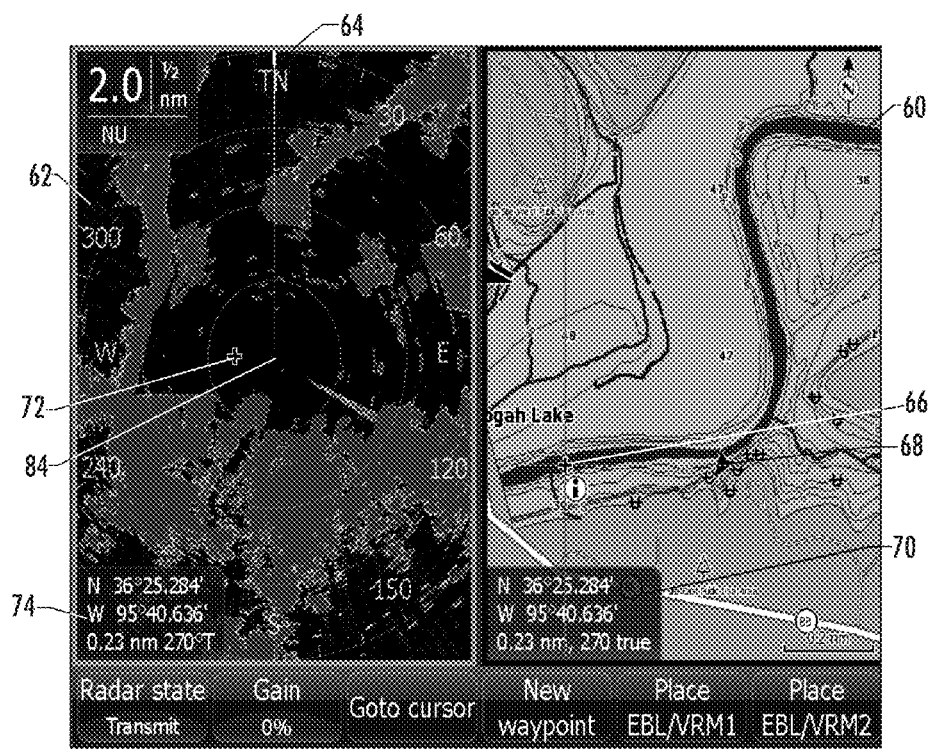

FIGS. 6 and 7 illustrate another user interface presentation according to an exemplary embodiment of the present invention. As shown in FIG. 6, the radar data window 62 includes a sourcing window indicator 64 indicating that the radar data window 62 is the sourcing window. In a manner similar to that explained above with respect to FIGS. 4 and 5, the cursor 72 of the radar display window 62 may be called up and moved from a current position to another position within the window, the other position indicating a particular geographical location within the geographic area presented by the window 62. In synch with these events, then, the cursor 66 of the navigation data window 60 may be called up and moved to the same geographical location within the geographical area within that window 60. Again, this synchronization of the geographical location may be reflected by not only the cursors 66 and 72, but also by the cursor position areas 70 and 74 (shown as reflecting the same latitude and longitude).

FIG. 7 illustrates that the vessel has moved to a different location as indicated by the center position area 84 on the radar data window 62. Navigation data window 60 also illustrates that the vessel has moved to a different location as indicated by the current vessel position marker 68. Nevertheless, the radar cursor position information area 74 indicates that the cursor 72 has not changed, and the chart cursor position information area 70 and the radar cursor position information area 74 indicate that the cursor 66 and the cursor 72 are positioned at the same geographical location on their respective window. Accordingly, the cursor 66 remains synchronized with the cursor 72 by, for example, maintaining the correct distance and bearing from the vessel.

Figure 8:
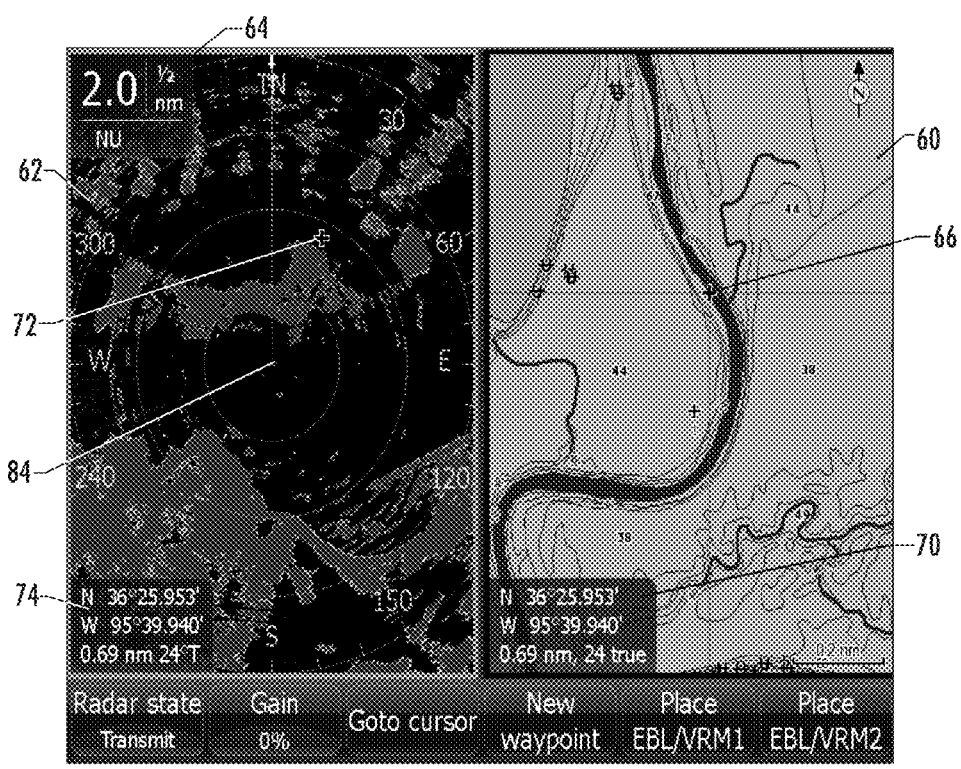

In some embodiments, the geographical view of the sourcing window may be larger than that of the sourced window. As such, if the cursor of the sourcing window is moved to a location outside the current view of the sourced window, the cursor of the sourced window may be automatically moved to the corresponding location of the cursor of the sourcing window, and the view of the sourced window may be automatically adjusted (e.g., via zooming in or out, and/or panning) to display the new position of the cursor of the sourced window. In some examples, the new view may be centered based on the new location of the cursor of the sourced window. FIG. 8, for example, illustrates that the view of the radar data window 62 (sourcing window) may be larger than the view of the navigation data window 60 (sourced window). As such, if the cursor 72 is moved to a geographical location outside the view of the navigation data window 60, the cursor 66 may be automatically moved to the location corresponding to that of the cursor 72, and the view of the navigation data window 60 may be adjusted to display the new location of the cursor 66.

Figure 9:
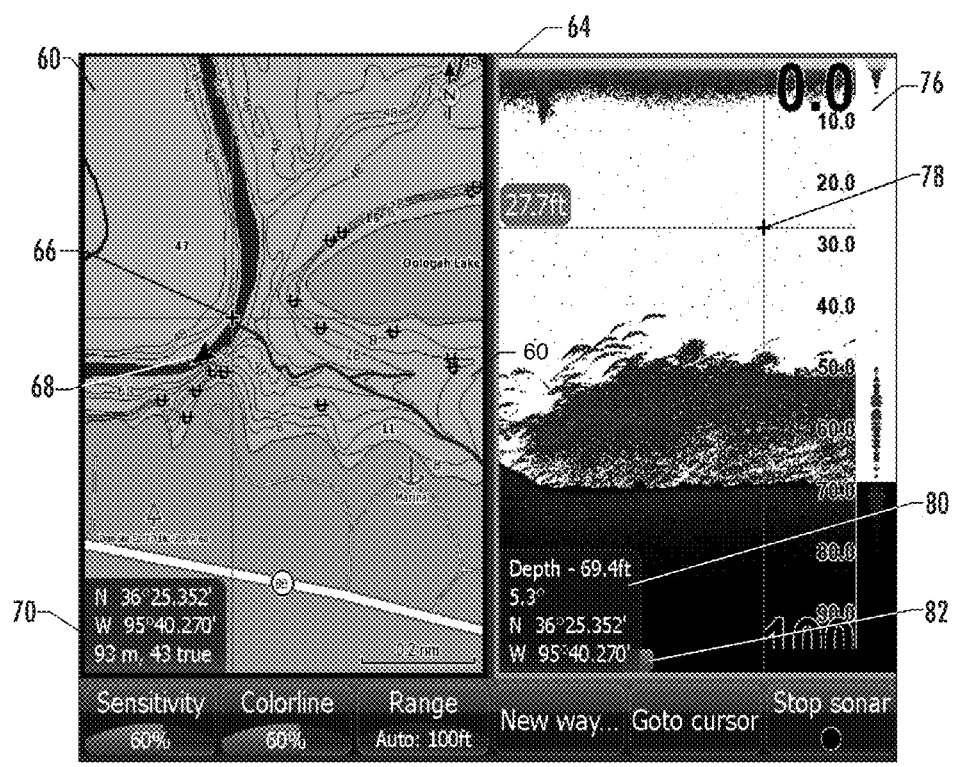
Figure 10:
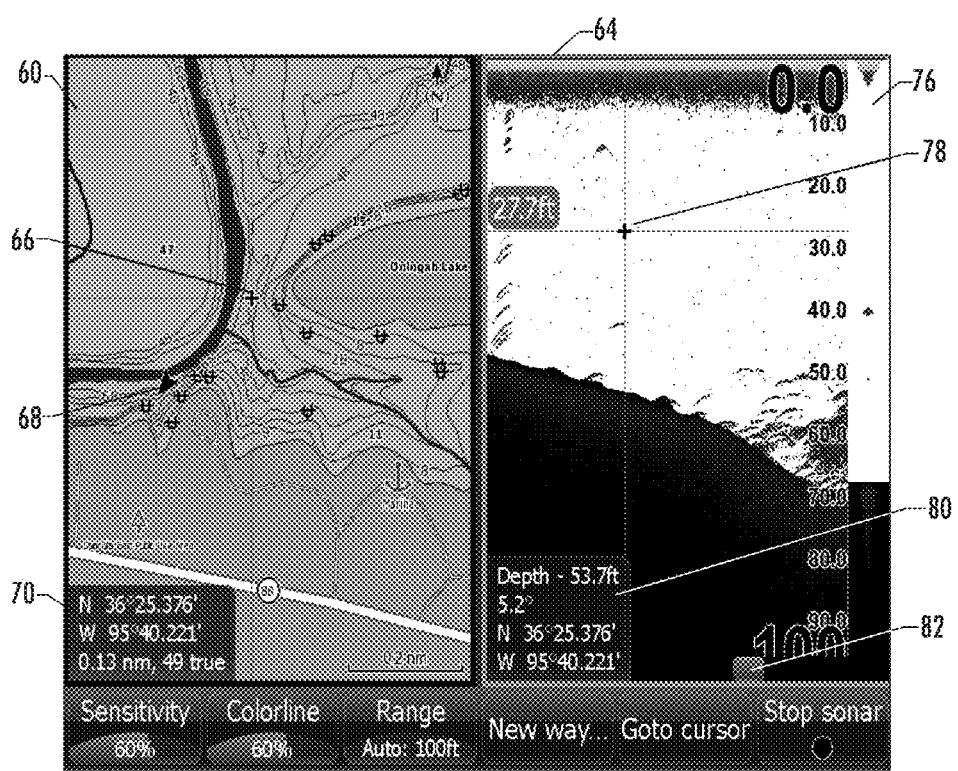

FIGS. 9 and 10 illustrate another user interface presentation according to an exemplary embodiment of the present invention. As shown in FIG. 9, the navigation data window 60 may be displayed along with a sonar data window 76. The sonar data window 76 may include sonar data and/or other related data provided, for example, in response to data received from the detection component 14. Similar to the other windows 60 and 62, the sonar data window 76 may include a cursor 78 indicating a particular geographical location within the geographical area presented by the sonar chart within the window 76, and a sonar cursor position information area 80 that may identify the particular geographical location indicated by the cursor 78. As also shown, the sonar data window 76 may also include a second, historical cursor 82 that may be used to scroll over stored historical sonar data (pan through the geographical area presented in the window). The historical cursor 82 may be indicative of a time in history. The historical cursor 82 positioned on the far right side of the sonar data window 76 may be indicative of real-time operation. A user may interact with the user input interface to move the historical cursor 82 forward or backward, and thus move the sonar chart forward or backward in time (e.g., via a left or right directional keys).

As shown in FIGS. 9 and 10, the sonar data window 76 is the currently-active (sourcing) window, as reflected by the sourcing window indicator 64. The cursor 80 and/or the historical cursor 82 may move accordingly to a corresponding geographical location at the desired time in history. The navigation data window 60 may receive the information associated with the new geographical location (e.g., longitude and latitude) indicated by the cursor 80 and/or the historical cursor 82, and the current cursor 66 may be automatically synchronized to the corresponding location within the geographical area presented by the navigation data window 60. As shown by the cursor position information areas 80 and 74, the cursors 78 and 70 of the windows 76 and 60 are positioned at the same geographical location on their respective windows. As illustrated in FIG. 10, as the cursor 80 and/or the historical cursor 82 may move to a different location at a desired time in history, the current cursor 66 may be automatically plotted at the corresponding location.

Although not illustrated, the sonar data window 76 may at any given time function as a sourced window and the navigation data window 60 or the radar data window 62 may function as the sourcing window. Because the sonar data window 76 may not store or display all possible geographical coordinates but rather a series of geographical points, the historical cursor 82 of the sonar data window 76 may be positioned in a location in the sonar log history proximate to the new location indicated by the cursor of the sourcing window. As such, the sonar data window 76 may be configured to display a message indicating information regarding the difference between the selected location in history and the new position of the cursor of the sourcing window (e.g., the distance, the difference in the latitude and/or longitude or the like).

Figure 11:
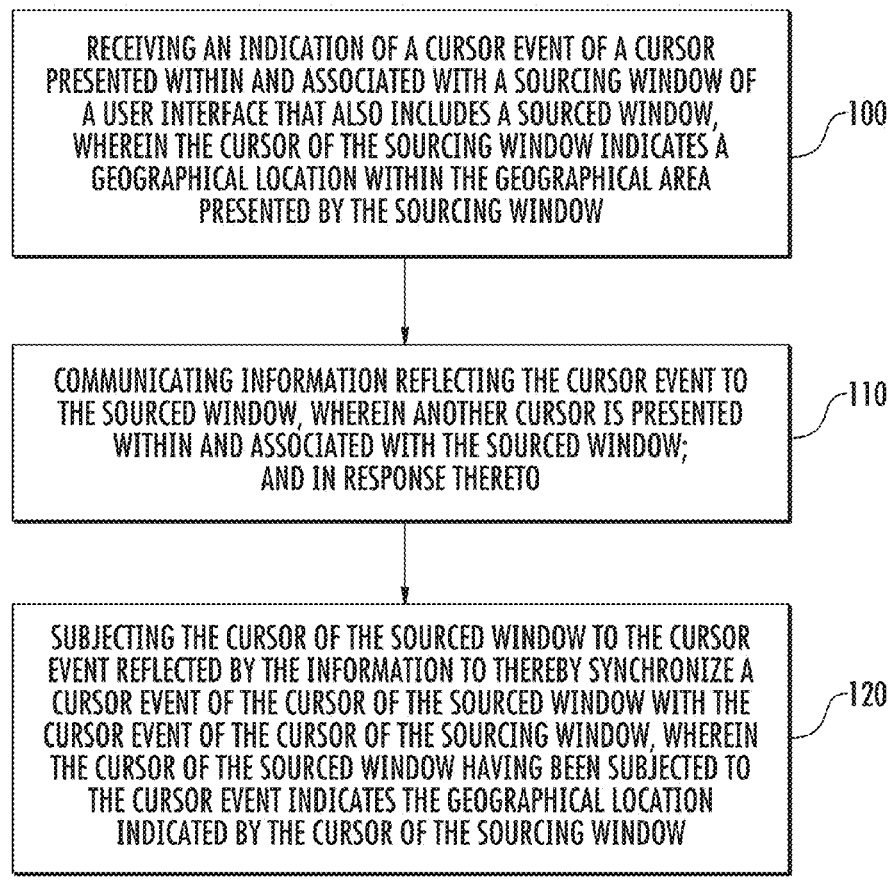
FIG. 11 is a flowchart including various operations of a method of synchronizing cursor events according to one exemplary embodiment of the present invention.

FIG. 11 is a flowchart of an apparatus, method and program product according to an exemplary embodiment of the invention. It will be understood that each block or step of the flowchart, and combinations of blocks in the flowchart, can be implemented by various means, such as hardware, firmware, and/or software including one or more computer program instructions. For example, one or more of the functions described above may be embodied by computer program instructions. In this regard, the computer program instructions which embody the functions described above may be stored by a memory device of, for example, the head unit 22 and executed by a built-in processor in the head unit 22. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

One exemplary embodiment of a method of synchronizing cursor events, as shown in FIG. 11, may include receiving an indication of a cursor event of a cursor presented within and associated with a sourcing window of a user interface that also includes a sourced window, wherein the cursor of the sourcing window may indicate a geographical location within the geographical area presented by the sourcing window at operation 100, communicating information reflecting the cursor event to the sourced window, wherein another cursor may be presented within and associated with the sourced window, at operation 110, and in response thereto, subjecting the cursor of the sourced window to the cursor event reflected by the information to thereby synchronize a cursor event of the cursor of the sourced window with the cursor event of the cursor of the sourcing window, wherein the cursor of the sourced window having been subjected to the cursor event may indicate the geographical location indicated by the cursor of the sourcing window at operation 120.

In some embodiments, certain ones of the operations above may be modified or further amplified as described below. It should be appreciated that each of the modifications or amplifications below may be included with the operations above either alone or in combination with any others among the features described herein. In this regard, for example, the method may further include providing for display of the cursor associated with the at least one sourced window subjected to the at least one cursor event. The method may further include comparing a type of information provided by the sourcing window with a type of information provided by the at least one sourced window, wherein subjecting the cursor of the sourced window to the cursor event may include subjecting the cursor of the sourced window to the cursor event based at least in part on the comparison. In some embodiments, the cursor of the sourced window having been subjected to the cursor event may indicate the geographical location indicated by the cursor of the sourcing window but within the geographical area presented by the sourced window. In other embodiments, the cursor of the sourced window and the cursor of the sourcing window may indicate the same geographical location but the cursor of the sourced window may indicate a position within the sourced window different from the position indicated by the cursor of the sourcing window within the sourcing window.

In an exemplary embodiment, communicating information reflecting the cursor event at operation 110 may include communicating geographical coordinates of the geographical location indicated by the cursor of the sourcing window. In other exemplary embodiments, receiving an indication of a cursor event at operation 100 may include receiving an indication of a movement of the cursor of the sourcing window from indicating one geographical location to indicating another geographical location within the geographical area presented by the sourcing window. In yet other exemplary embodiments, receiving an indication of a cursor event at operation 100 may include receiving an indication of a cursor event wherein the sourcing and sourced windows present respective geographical areas that at least partially overlap. In some examples, subjecting the cursor of the sourced window to the cursor event at operation 120 may include modifying a view of the sourced window. In some embodiments, the user interface may include a plurality of windows, and the method may further include identifying one of the windows as the sourcing window and another of the windows as the sourced window. In other embodiments, the plurality of windows may include a window presenting a sonar chart, a window presenting a map and a window presenting a radar plan position indicator, each of the sonar chart, map and plan position indicator presenting a respective geographical area.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In an exemplary embodiment, an apparatus for performing the method of FIG. 11 above may comprise a processor (e.g., the processor 28) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may include, for example, the processor 28, respective ones of the sonar module 36, the navigation module 38, the radar system, and/or the cursor synchronizer 42, or an algorithm executed by the processor for processing information as described above.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving an indication of a sourcing cursor event of a sourcing cursor presented within and associated with a sourcing window of a user interface that also includes a sourced window, wherein the indication does not include user selection of an item or data, wherein the sourcing cursor of the sourcing window indicates a particular geographical location within a larger geographical area presented by the sourcing window, wherein the sourcing window displays at least one of navigation data, radar data, or sonar data;

communicating information reflecting the sourcing cursor event to the sourced window, wherein a sourced cursor is presented within and associated with the sourced window, wherein the sourced window displays at least one of navigation data, radar data, or sonar data, and wherein the sourcing window displays different data than the sourced window; and in response thereto, subjecting the sourced cursor of the sourced window to the sourcing cursor event reflected by the information to thereby synchronize a sourced cursor event of the sourced cursor of the sourced window with the sourcing cursor event of the sourcing cursor of the sourcing window and synchronize the sourced cursor with the sourcing cursor according to said indication such that the sourced cursor of the sourced window indicates the geographical location indicated by the sourcing cursor of the sourcing window.

2. The method of claim 1, further comprising comparing a type of information presented by the sourcing window with a type of information presented by the sourced window, wherein subjecting the sourced cursor of the sourced window to the sourcing cursor event includes subjecting the sourced cursor of the sourced window to the sourcing cursor event based at least in part on the comparison.

3. The method of claim 1, wherein communicating information reflecting the sourcing cursor event comprises communicating geographical coordinates of the geographical location indicated by the sourcing cursor of the sourcing window.

4. The method of claim 1, wherein the user interface includes a plurality of windows, and wherein the method further comprises identifying one of the windows as the sourcing window and another of the windows as the sourced window.

5. The method of claim 4, wherein the plurality of windows include a window presenting a sonar chart, a window presenting a map and a window presenting a radar plan position indicator, each of the sonar chart, map and plan position indicator presenting a respective geographical area.

6. The method of claim 1, wherein receiving an indication of the sourcing cursor event comprises receiving an indication of a movement of the sourcing cursor of the sourcing window from one geographical location to another geographical location within the geographical area presented by the sourcing window.

7. The method of claim 1, wherein subjecting the sourced cursor of the sourced window to the sourcing cursor event includes modifying a view of the sourced window.

8. The method of claim 1, wherein the sourced cursor of the sourced window is subjected to the sourcing cursor event such that the sourced cursor indicates the geographical location indicated by the sourcing cursor of the sourcing window but within the geographical area presented by the sourced window.

9. The method of claim 1, wherein the sourced cursor of the sourced window and the sourcing cursor of the sourcing window indicate the same geographical location but the sourced cursor of the sourced window indicates a position within the sourced window different from the position indicated by the sourcing cursor of the sourcing window within the sourcing window.

10. The method of claim 1, wherein the sourced window displays sonar data, wherein the sourced cursor comprises a historical cursor, and wherein subjecting the sourced cursor to the sourcing cursor event comprises subjecting the historical cursor to the sourcing cursor event such that the historical cursor indicates a location different from and proximate to the geographical location indicated by the sourcing cursor.

11. A non-transitory computer-readable storage medium having computer-readable program code portions stored therein, the computer-readable program code portions comprising:

program code instructions for receiving an indication of a sourcing cursor event of a sourcing cursor presented within and associated with a sourcing window of a user interface that also includes a sourced window, wherein the indication does not include user selection of an item or data, wherein the sourcing cursor of the sourcing window indicates a particular geographical location within a larger geographical area presented by the sourcing window, wherein the sourcing window displays at least one of navigation data, radar data, or sonar data;

program code instructions for communicating information reflecting the sourcing cursor event to the sourced window, wherein a sourced cursor is presented within and associated with the sourced window, wherein the sourced window displays at least one of navigation data, radar data, or sonar data, and wherein the sourcing window displays different data than the sourced window; and in response thereto, program code instructions for subjecting the sourced cursor of the sourced window to the sourcing cursor event reflected by the information to thereby synchronize a sourced cursor event of the sourced cursor of the sourced window with the sourcing cursor event of the sourcing cursor of the sourcing window and synchronize the sourced cursor with the sourcing cursor according to said indication such that the sourced cursor of the sourced window indicates the geographical location indicated by the sourcing cursor of the sourcing window.

12. The computer program product of claim 11, further comprising program code instructions for comparing a type of information presented by the sourcing window with a type of information presented by the sourced window, wherein subjecting the sourced cursor of the sourced window to the sourcing cursor event includes subjecting the sourced cursor of the sourced window to the sourcing cursor event based at least in part on the comparison.

13. The computer program product of claim 11, wherein program code instructions for communicating information reflecting the sourcing cursor event comprises program code instructions for communicating geographical coordinates of the geographical location indicated by the sourcing cursor of the sourcing window.

14. The computer program product of claim 11, wherein the user interface includes a plurality of windows, and wherein the computer program product further comprises program code instructions for identifying one of the windows as the sourcing window and another of the windows as the sourced window.

15. The computer program product of claim 14, wherein the plurality of windows include a window presenting a sonar chart, a window presenting a map and a window presenting a radar plan position indicator, each of the sonar chart, map and plan position indicator presenting a respective geographical area.

16. The computer program product of claim 11, wherein program code instructions for receiving an indication of the souring cursor event comprises program code instructions for receiving an indication of a movement of the sourcing cursor of the sourcing window from one geographical location to another geographical location within the geographical area presented by the sourcing window.

17. The computer program product of claim 11, wherein subjecting the sourced cursor of the sourced window to the sourcing cursor event comprises modifying a view of the sourced window.

18. The computer program product of claim 11, wherein the sourced cursor of the sourced window is subjected to the sourcing cursor event such that the sourced cursor indicates the geographical location indicated by the sourcing cursor of the sourcing window but within the geographical area presented by the sourced window.

19. The computer program product of claim 11, wherein the sourced cursor of the sourced window and the sourcing cursor of the sourcing window indicate the same geographical location but the sourced cursor of the sourced window indicates a position within the sourced window different from the position indicated by the sourcing cursor of the sourcing window within the sourcing window.

20. An apparatus comprising a processor and a memory including computer program code, the memory and computer program code configured to, with the processor, cause the apparatus to:
receive an indication of a sourcing cursor event of a sourcing cursor presented within and associated with a sourcing window of a user interface that also includes a sourced window, wherein the indication does not include user selection of an item or data, wherein the sourcing cursor of the sourcing window indicates a particular geographical location within a larger geographical area presented by the sourcing window, wherein the sourcing window displays at least one of navigation data, radar data, or sonar data;
communicate information reflecting the sourcing cursor event to the sourced window, wherein a sourced cursor is presented within and associated with the sourced window, wherein the sourced window displays at least one of navigation data, radar data, or sonar data, and wherein the sourcing window displays different data than the sourced window; and in response thereto,
subject the sourced cursor of the sourced window to the sourcing cursor event reflected by the information to thereby synchronize a sourced cursor event of the sourced cursor of the sourced window with the sourcing cursor event of the sourcing cursor of the sourcing window and synchronize the sourced cursor with the sourcing cursor according to said indication such that the sourced cursor of the sourced window indicates the geographical location indicated by the sourcing cursor of the sourcing window.

21. The apparatus of claim 20, wherein the memory and computer program code are further configured to cause the apparatus to:
compare a type of information presented by the sourcing window with a type of information presented by the sourced window; and subject the sourced cursor of the sourced window to the sourcing cursor event by
subjecting the sourced cursor of the sourced window to the sourcing cursor event based at least in part on the comparison.

22. The apparatus of claim 20, wherein the memory and computer program code are further configured to cause the apparatus to communicate information reflecting the sourcing cursor event by communicating geographical coordinates of the geographical location indicated by the sourcing cursor of the sourcing window.

23. The apparatus of claim 22, wherein the user interface includes a plurality of windows, and wherein the memory and computer program code are further configured to cause the apparatus to identify one of the windows as the sourcing window and another of the windows as the sourced window.

24. The apparatus of claim 20, wherein the plurality of windows include a window presenting a sonar chart, a window presenting a map and a window presenting a radar plan position indicator, each of the sonar chart, map and plan position indicator presenting a respective geographical area.

25. The apparatus of claim 20, wherein the memory and computer program code are further configured to cause the apparatus to receive an indication of the sourcing cursor event by receiving an indication of a movement of the sourcing cursor of the sourcing window from one geographical location to another geographical location within the geographical area presented by the sourcing window.

26. The apparatus of claim 20, wherein the memory and computer program code are further configured to cause the apparatus to subject the sourced cursor of the sourced window to the sourcing cursor event by modifying a view of the sourced window.

27. The apparatus of claim 20, wherein the sourced cursor of the sourced window is subjected to the sourcing cursor event indicates the geographical location indicated by the sourcing cursor of the sourcing window but within the geographical area presented by the sourced window.

28. The apparatus of claim 20, wherein the sourced cursor of the sourced window and the sourcing cursor of the sourcing window indicate the same geographical location but the sourced cursor of the sourced window indicates a position within the sourced window different from the position indicated by the sourcing cursor of the sourcing window within the sourcing window.

29. The method of claim 1, wherein the sourced window presents a geographical area larger than the geographical location indicated by the sourcing cursor.

* * * * *